United States Patent [19]

Giroud-Abel et al.

[11] Patent Number: 4,977,213
[45] Date of Patent: Dec. 11, 1990

[54] MOULDING COMPOSITIONS COMPRISED OF SEMIRIGID, FATTY ACID COPOLYAMIDES, ELASTOMERS AND OPTIONALLY CONVENTIONAL POLYAMIDES

[75] Inventors: Bruno Giroud-Abel; Jean Goletto, both of Ecully, France

[73] Assignee: Rhone-Poulenc Specialites Chimiques, Courbevoie, France

[21] Appl. No.: 59,204

[22] Filed: Jun. 8, 1987

Related U.S. Application Data

[63] Continuation of Ser. No. 529,855, Sep. 6, 1983, abandoned.

[30] Foreign Application Priority Data

Sep. 6, 1982 [FR] France .................................. 82 15271

[51] Int. Cl.$^5$ ..................... C08L 77/00; C08L 75/04; C08L 83/04
[52] U.S. Cl. ...................................... 525/66; 525/179; 525/183; 525/184; 525/420.5; 525/424; 525/425; 525/431; 525/432
[58] Field of Search .................... 525/183, 184, 420.5, 525/66, 424, 432, 425, 179, 421

[56] References Cited

U.S. PATENT DOCUMENTS

| | | | |
|---|---|---|---|
| 4,132,690 | 1/1979 | Eernstmann | 525/184 |
| 4,299,744 | 11/1981 | Stewart | 525/183 |
| 4,452,974 | 6/1984 | Goletto et al. | 528/336 |

*Primary Examiner*—Ana L. Carrillo
*Attorney, Agent, or Firm*—Burns, Doane, Swecker & Mathis

[57] ABSTRACT

Polyamide-based molding compositions having enhanced flexibility and resilience, especially at low temperatures, are prepared from (1) semirigid copolyamides prepared from fatty acid dimers, (2) elastomers containing moieties compatible or reactive with such copolyamides (1) and comprising olefinic copolymers bearing carboxyl and/or carboxylate groups, copolyester-amides, polyurethanes, organopolysiloxane and polyurethane block copolymers, and copolymers produced from a latex which comprises suitable functional groups, and, optionally, (3) conventional polyamides.

13 Claims, No Drawings

MOULDING COMPOSITIONS COMPRISED OF SEMIRIGID, FATTY ACID COPOLYAMIDES, ELASTOMERS AND OPTIONALLY CONVENTIONAL POLYAMIDES

This application is a continuation of application Ser. No. 529,855, filed Sept. 6, 1983, now abandoned.

BACKGROUND OF THE INVENTION

1. Field of the Invention

The present invention relates to novel polymeric compositions of matter comprising a semirigid copolyamide and at least one suitable elastomer having excellent flexibility and resilience characteristics, especially at low temperatures. The present invention also relates to processes for the formulation of the subject polymeric compositions, to means adopted for carrying out same and to shaped articles prepared therefrom.

2. Description of the Prior Art

The polyamides have long been known to this art for their excellent mechanical properties, very good heat resistance and abrasion resistance and also excellent surface appearance. Molded or extruded polyamides have found numerous applications in appliances and machinery for domestic or industrial use, in the electronics industry, in automotive components, in gear wheels, etc. There are, however, certain particular applications in which there is a need for polyamides having greater flexibility than that of the conventional polyamides such as nylon 6,6 (a polymer of hexamethylenediamine and of adipic acid) or nylon 6 (a polymer of ε-caprolactam); as exemplary of fields of application where this need exists, representative are the manufacture of shoe soles, of tightening bands used in the electrical industry, of internal packings and of flexible hoses used in the automotive industry. Polyamides which are suitable for these applications are known and described, for example, in French Patent No. 2,407,227 and in French Patent Application No. 79/17,264 published under No. 2,459,810. The polyamides according to the aforementioned French patent are prepared by employing a mixture comprising a salt of a particular fatty acid dimer and hexamethylenediamine, and caprolactam, the said salt being in the form of a solution in a particular solvent based on a mixture of water and an alcohol having fewer than 5 carbon atoms, a mixture of water and caprolactam or caprolactam itself. The dimeric acids employed are obtained by polymerization of mixtures comprising a major proportion of monomeric fatty acids having from 16 to 20 carbon atoms and a minor proportion of monomeric fatty acids having from 8 to 15 and/or from 21 to 24 carbon atoms. Moreover, the process of preparation is carried out in such manner that the stoichiometry of the salt is rigorously adhered to by measuring the pH of the salt in solution in a well-defined solvent medium which is not necessarily the same as that used in the preparation of the reaction mixture. The polyamides according to the aforementioned French patent application are prepared from fatty acid dimers of the same type as described above, adipic acid and hexamethylenediamine, while ensuring that the molar ratio of adipic acid to total acids ranges from 0.5 to 0.99 and employing a series of operations under conditions of temperature and pressure which are selected such as to provide homogeneous copolymers which exhibit only a single phase in the molten state or in the solid state.

Nonetheless, experiments which have been carried out with semirigid copolyamides according to the above-mentioned patent or patent application indicate that their flexibility (measured in the usual manner in terms of the value of the flexural modulus and torsional modulus) and their impact strength, which are at a satisfactory level at ambient temperature, on the other hand decrease greatly when the molded articles shaped therefrom are subjected to low temperatures such as those ranging from 0° C. to −40° C. This is a disadvantage which considerably restricts the entry of these semirigid polyamide articles into certain markets, such as the sports and leisure markets.

It too is known to incorporate plasticizers into polyamides in order to increase their flexibility and resilience. However, this method does not provide satisfactory results. In fact, the majority of the plasticizers suitable for plastics are insufficiently compatible with polyamides and separate out partially, through migration, during processing; moreover, these plasticizers, which are able to lower the flexural modulus and torsional modulus at ambient temperature and to increase the impact strength are on the other hand generally ineffective and even detrimental in respect to resilience properties at temperatures below 0° C.

SUMMARY OF THE INVENTION

Accordingly, a major object of the present invention is the provision of means to reduce the flexural modulus and torsional modulus (and hence to improve the flexibility), and to increase the resilience of semirigid polyamides, especially at low temperatures, without detracting from certain other properties which are important in respect of the machinability and use of the materials, for example, the tendency towards crystallization, the recovery of rigidity after processing and the dimensional stability, by incorporating elastomers of a suitable nature into the polyamide matrix.

Briefly, the present invention features improved polyamide-based molding compositions having excellent flexibility and resilience characteristics, especially at temperatures as low as those ranging from 0° C to −40° C, which improved polymeric compositions comprise:

(1) a semirigid copolyamide prepared from fatty acids dimers;

(2) and at least one elastomer comprising recurring units compatible with or reactive with the copolyamide (1) and being selected from among:

(a) olefinic copolymers derived from an aliphatic α-olefin containing from 2 to 6 carbon atoms and at least one comonomer selected from among the class of α,β-unsaturated monocarboxylic or dicarboxylic acids containing from 3 to 8 carbon atoms, lower alkyl esters of such acids and anhydrides derived therefrom;

(b) olefinic copolymers containing carboxyl and/or carboxylate groups and derived from ethylene and at least one α-olefin comonomer having from 3 to 6 carbon atoms;

(c) olefinic copolymers containing carboxyl and/or carboxylate groups and derived from ethylene, at least one α-olefin comonomer having from 3 to 6 carbon atoms and at least one non-conjugated aliphatic diene comonomer containing at least 5 carbon atoms;

(d) copolyester-amides obtained from (i) an acid compound containing 1 to 100 mole % of a diacid or derivative having from 15 to 60 carbon atoms and 0 to 99 mole % of at least one other difunctional comonomer selected from among diacids, aminoacids, hydroxyacids and their ester- and amide-forming derivatives thereof, such compounds having a number of carbon atoms at most equal to 12, (ii) a dihydroxylic compound which can be a linear, branched or cyclic diol having from 2 to 8 carbon atoms and/or a macromolecular dihydroxylic compound having a molecular weight ranging from 500 to 5,000, such as a polyoxyethylene glycol, polytetrahydrofuran or polyoxypropylene glycol and (iii) an amine compound comprising at least one diamine and/or at least one aminoalcohol having a number of carbon atoms at most equal to 25, it being possible to omit the compound (iii) in cases where the acid compound (i) already contains an amine-type function;

(e) polyurethanes obtained from (i) an aliphatic polyester and/or an aliphatic polyether having a terminal hydroxyl group and having a molecular weight ranging from 500 to 4,000, (ii) an aliphatic diol containing 2 to 8 carbon atoms and optionally having a substituent of the nitro, chloro, bromo or fluoro type and (iii) an aromatic diisocyanate;

(f) organopolysiloxane and polyurethane block copolymers obtained by reaction of (i) a polysiloxane macrodiol (or polysiloxane macrodiisocyanate) produced by the reaction of an α, ω-hydrogenopolysiloxane of the formula:

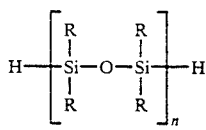

in which n is a number ranging from 10 to 80 and the substituents R, which may be identical or different, represent methyl, vinyl or phenyl groups, with a primary ethylenically unsaturated monoalcohol (or ethylenically unsaturated monoisocyanate) and (ii) a low molecular weight diol and a low molecular weight diisocyanate;

(g) copolymers of unsaturated monomers, having at least one elastomeric phase and obtained in the form of particle sizes ranging from 0.05 to 1.5 μm by emulsion polymerization of an alkyl acrylate, an alkyl methacrylate or a conjugated aliphatic diene, at least one unsaturated comonomer which bears a carboxylic acid group or derivative thereof, amine group or derivative thereof, nitrile group, sulfonic acid group or derivative thereof, and optionally at least one other ethylenically unsaturated comonomer.

DETAILED DESCRIPTION OF THE INVENTION

More particularly according to the present invention, the component semirigid polyamides that are preferably employed are the copolyamides which are described in French Patent No. 2,407,227 and in French Patent Application No. 79/17,264, referred to above. Among these copolyamides, more preferred are those which are produced from fatty acid dimers conforming to the definition given above, in which the dimer fraction is greater than 95% by weight, the monomer fraction is less than 0.5% by weight and the remainder is of a functionability greater than 2.

As the elastomers (2a), preferred are the copolymers derived from ethylene and at least one compound selected from among acrylic acid, methacrylic acid, maleic acid, fumaric acid, itaconic acid, the lower alkyl esters of these acids and the anhydrides derived from these acids. These copolymers in general contain 60 to 98 mole % and preferably 70 to 95 mole % of units originating from the o-olefin and 40 to 2 mole % and preferably 30 to 5 mole % of units originating from the acidic compound or compounds (the acid itself and/or a derivative thereof). Exemplary of copolymers of this type which are very suitable, representative are ethylene/acrylic acid, ethylene/methacrylic acid and ethylene/acrylic acid/methyl methacrylate copolymers.

As the elastomers (2b), preferred are the copolymers derived from ethylene and propylene. Carboxyl and/or carboxylate groups can also be introduced, either by direct copolymerization of the mixture of ethylene and α-olefin having from 3 to 6 carbon atoms with at least one unsaturated compound selected from the class of α,β-unsaturated dicarboxylic acids containing from 4 to 8 carbon atoms (maleic acid, fumaric acid and itaconic acid), the lower alkyl esters of these acids and the anhydrides derived from these acids, or by grafting one or more acidic compounds (the acid itself and/or a derivative thereof) onto the olefinic base, the grafting being induced by ionization, by hydroperoxidation, or by heat and pressure. To prepare such copolymers, the amounts of reactants used are generally such that the molar ratio ethylene/α-olefin ranges from 9:1 and preferably from 5:1 to 2:1, and that the molar percentage of the acidic compound or compounds (the acid itself and/or a derivative thereof) relative to the total of the reactants ranges from 1% to 30%. Exemplary of the copolymers of this type which are very suitable, representative are ethylene/propylene copolymers grafted with maleic anhydride or grafted with fumaric acid.

As the elastomers (2c), preferred are the copolymers derived from ethylene, propylene and a diene such as hexa-1,4-diene, norborna-2,5 diene or octa-1,7-diene. The introduction of carboxyl and/or carboxylate groups is effected by treating the ethylene/α-olefin/diene mixture in the manner indicated above for the case of the ethylene/α-olefin mixture. To prepare such copolymers, the amounts of reactants used are generally such that the molar ratio ethylene/α-olefin ranges from 9:1 to 1:9 and preferably from 5:1 to 2:1, that the molar percentage of diene relative to the total amount of ethylene +α-olefin ranges from 0.2% to 5% and preferably from 0.75% to 2% and that the molar percentage of the acid compound or compounds (the acid itself and/or a derivative thereof) relative to the total amount of the reactants ranges from 0.05% to 5%. Exemplary of copolymers of this type which are very suitable, representative are ethylene/propylene/hexa-1,4-diene copolymers grafted with maleic anhydride or grafted with fumaric acid.

The copolyester-amides (2d) which are exemplary are described in French Patent Application No. 79/30,650 published under No. 2,471,394. Preferably, copolyester-amides are used in which the proportion by weight of ester units ranges from 50 to 80% by weight and the diacids having from 15 to 60 carbon atoms are fatty acid dimers corresponding to the definition given above in relation to the dimers used for preparing the copolyamides employed in the present invention. As copolyesteramides of this type which are very suitable, exemplary are compounds such as those described in Examples 1 to 10 of the above-mentioned French patent application.

The polyurethanes (2e) which are exemplary are described, for example, in U. S. Pat. Nos. 2,729,618 and 3,475,383 and in Belgian Patent No. 698,558. For example, very suitable polymers of this type are those marketed by Goodrich under the trademark ESTANE, by Bayer under the trademark DESMOPAN, by BASF under the trademark ELASTOLAN and by Upjohn under the trademark PELLETHANE.

The organopolysiloxane and polyurethane copolymers (2f) which can additionally be used are described in French Patent Application No. 81/18,573 published under No. 2,513,644. Preferably, copolymers are employed in which:

(i) the α,ω-hydrogenopolysiloxane is an α,ω-hydrogenopolydimethylsiloxane;

(ii) the ethylenically unsaturated primary monoalcohol is a compound having, for example, the formula:

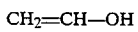

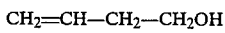

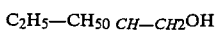

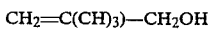

(iii) the ethylenically monoisocyanate is a compound having, for example, the formula:

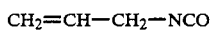

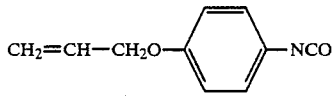

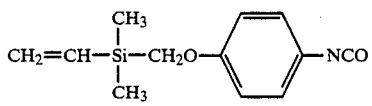

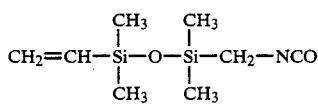

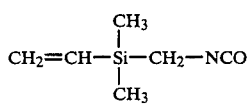

(iv) the low molecular weight diol is, for example, a compound such as butane-1,4-diol or hexane-1,6-diol; and (v) the low molecular weight diisocyanate is, for example, a compound such as 1,6-diisocyanato-hexane, diisocyanatotoluene or 4,4′-bis-isocyanato-diphenylmethane.

As the copolymers (2f), preferred are the compounds such as those described in Examples 1 to 14 of the above-mentioned French patent application.

The copolymers (2g) which may additionally be used can be obtained in one step by emulsion copolymerization of the mixture of the constituent monomers. This mixture in general comprises:

(i) from 50% to 99% by weight of an alkyl acrylate, an alkyl methacrylate or a conjugated aliphatic diene;

(ii) from 1% to 50% by weight of at least one unsaturated comonomer bearing a carboxylic acid group or derivative thereof, amine group or derivative thereof, nitrile group, sulfonic acid group or derivative thereof; and (iii) from 0% to 49% by weight of at least one other ethylenically unsaturated comonomer, and is intended to provide a copolymer whose glass transition temperature is below −25° C. Since these copolymers are difficult to obtain in the form of a fine powder from the latex they are, within the scope of the present invention, preferably employed in the form of a latex and introduced into the polycondensation medium of the semirigid copolyamide. It is preferred to employ copolymers of this type which contain from 1% to 10% of at least one comonomer bearing functional groups.

The copolymers (2g) can also be obtained in a plurality of emulsion polymerization steps and can have a so-called "core and skin" structure. In this case, same are obtained by emulsion polymerization of a first elastomeric phase (the core phase), produced by reacting a mixture M1 comprising:

(i) from 50% to 100% by weight of an alkyl acrylate, an alkyl methacrylate or a conjugated aliphatic diene; and (ii) from 0% to 50% by weight of at least one other ethylenically unsaturated comonomer, followed by emulsion polymerization grafting, onto the elastomeric "core", of at least one other polymeric phase produced by reacting a mixture M2 comprising:

(i) from 10% to 100% by weight of at least one unsaturated monomer bearing a carboxylic acid group or derivative thereof, amine group or derivative thereof, nitrile group, sulfonic acid group or derivative thereof; and (ii) from 0% to 90% by weight of at least one other ethylenically unsaturated comonomer.

Within the scope of the present invention, preferred are grafted copolymers of this type in which the elastomeric "core" part (M1) represents from 50% to 90% by weight of the total composition and in which at least 50% of the grafted part (M2) is obtained from a monomer which by homopolymerization provides polymers having a glass transition temperature above 20° C. These copolymers can easily be converted into the form of a fine powder by coagulating the latex and drying the product.

In the definition of the copolymers (2g) given above:

(i) the alkyl acrylate or methacrylate is preferably an ester derived from aliphatic alcohols having from 2 to 6 carbon atoms, for example, butyl acrylate or butyl methacrylate;

(ii) the conjugated aliphatic diene preferably contains from 4 to 8 carbon atoms and is, for example, buta-1,3-diene;

(iii) the unsaturated comonomers bearing functional groups are, for example, maleic acid, fumaric acid, acrylic acid, methacrylic acid, methyl methacrylate, maleic anhydride, acrylamide, acrylonitrile or 4-vinylbenzenesulfonic acid; and (iv) the other ethylenically unsaturated comonomers are, for example, styrene and methyl methacrylate.

Copolymers of type (2g) are in particular described in U. S. Pat. Nos. 3,668,274, 3,796,771, 4,086,300 and 4,148,846.

It too has been found, and this constitutes another object of the present invention, that it can also be advantageous to introduce into the compositions of the invention a conventional polyamide (3) together with the semirigid copolyamide (1) and the elastomeric phase (2). It will be appreciated that by the term "conventional polyamide" there is essentially intended those materials obtained by polycondensation of diacids other than fatty acid dimers with diamines, or by homopolycondensation of aminoacids or by polymerization of lactams. Representative types are, for example, nylon 6,6 (a polymer of hexamethylenediamine and adipic acid), nylon 6,10 (a polymer of hexamethylenediamine and sebacic acid), nylon 6 (a polymer of ε-caprolactam), nylon 7 (a polymer of aminoheptanoic acid), nylon 9 (a polymer of aminononanoic acid), nylon 11 (a polymer of ω-aminoundecanoic acid), nylon 12 (a polymer of aminododecanoic acid) and mixtures of these polymers.

The amount of conventional polyamide (3) which can be employed typically represents 5 to 85% and preferably 10 to 50% by weight of the combination of semirigid copolyamide (1) +conventional polyamide (3).

The amount of elastomeric phase which can contain one or more elastomers can vary over rather wide limits depending upon the desired degree of flexibility. More precisely, the minimum proportion will correspond to the amount of the reinforcing material which is necessary for an improvement in the physical properties to begin to be noticeable; usually, this minimum proportion represents about 4% by weight of the combination of semirigid copolyamide (1)+elastomeric reinforcing material (2)+, optionally, conventional polyamide (3). The maximum proportion usually does not exceed 60% by weight of the above-mentioned combination. With larger amounts processing problems may be encountered. It has been found that compositions containing 10 to 40% by weight of elastomer or elastomers are generally very suitable.

The compositions according to the present invention can of course be modified by the addition of one or more additives such as stabilizers, for example, stabilizers against oxidative degradation, thermal degradation or ultraviolet radiation degradation inhibitors, lubricants and mold release agents, colorants, including dyes and pigments, nucleating agents and plasticizers.

The stabilizers can be incorporated into the composition at any stage of its preparation. Preferably, the stabilizers are included at a rather early stage to prevent degradation from beginning before it has been possible to protect the composition. These stabilizers must be compatible with the composition.

The oxidation stabilizers and heat stabilizers which are useful in the materials of the present invention include those generally used in polyamides. For example, they include up to 1% by weight, relative to the polyamide matrix [copolyamide (1)+, optionally, conventional polyamide (3)]: halides of metals of Group I of the Periodic Table, for example of sodium, potassium or lithium; copper (I) halides, for example, the chloride, bromide or iodide; sterically hindered phenols; hydroquinones; organic or inorganic phosphites; and various substituted members of these groups, as well as their combinations.

The ultraviolet stabilizers used, for example, in a proportion of up to 2% relative to the weight of the polyamide matrix, can also be those usually employed with polyamides. As examples, representative are the various substituted resorcinols, salicylates, benzotriazoles, benzophenones, hindered aromatic amines and substituted piperidine derivatives.

It is also possible to use antioxidant compounds of known type, such as the substituted aromatic amines. An example of such a compound is 4,4'-bis-(α,α-dimethylbenzyl)-diphenylamine.

Lubricants and mold release agents which can be used in a proportion of up to 2% relative to the weight of the composition are, for example, stearic acid and its inorganic salts, stearyl alcohol, stearamides and ester waxes.

Organic dyes and pigments, for example, titanium dioxide and carbon black, can be used in amounts of up to 5% relative to the weight of the composition.

The compositions can also contain nucleating agents, for example, talc, calcium fluoride, sodium phenylphosphinate, alumina and finely divided polytetrafluoroethylene, as well as plasticizers, in proportions of up to about 20% by weight of the composition, examples of plasticizers being dioctyl phthalate, dibenzyl phthalate, butyl benzyl phthalate, hydrocarbon oils, N,n-butylbenzene-sulfonamide and ortho- and para-tolueneethylsulfonamide.

The semirigid copolyamide (1), the selected elastomer or elastomers (2) and, optionally, the conventional polyamide (3) as well as the optional additives used, can be mixed directly in any manner which permits good homogenization. Preferably, the mixture of the various ingredients is prepared in the form of a powder or granules by first carrying out a cold malaxating operation in a conventional mixer and then carrying out a hot homogenization of the combination in a device capable of producing adequate shearing forces, for example, a single-screw or multi-screw extruder. The adequate shearing forces immediately above referred to are forces of the stated type which make it possible to disperse the elastomer or elastomers in the form of particle sizes ranging from 0.01 to 10 μm and preferably from 0.05 to 5 μm in the matrix of polyamide or polyamides.

After this treatment, the compositions of the invention are in general in the form of strands which are thereafter chopped into granules; these granules are subsequently used to form the desired articles by using conventional injection molding, transfer molding or extrusion apparatus.

The compositions according to the invention can also be prepared, and this constitutes a preferred embodiment of the invention, by first compounding a masterbatch in the form of granules based on a portion of the semirigid copolyamide (1) and the selected elastomer or elastomers (2), which masterbatch is subsequently mixed, before processing, with granules of the remainder of the copolyamide (1) which is to be modified. This method is valuable because it is thus possible to obtain compositions according to the invention whose properties are optimal even when using conventional conversion equipment such as single-screw extruders of lower dispersing power than the twin-screw extruders, for example, an extruder of the ZSK type.

This method of operation via the intermediate preparation of a masterbatch can also be employed by using the conventional polyamide (3) to produce the premix of the elastomer or elastomers. It has been observed, in this respect, that the use of a polyaminoacid produced by the homopolycondensation of aminoacids or the polymerization of lactams is a particularly advisable means of compounding the masterbatch. Nylons 6, 7, 9 and 11 are very especially suitable for this purpose.

The masterbatch, when utilized, generally contains 30 to 70% by weight of polyamide [a portion of the semirigid copolyamide (1) or the conventional polyamide (3)] and 70 to 30% by weight of elastomer or elastomers (2). Preferably, it contains 50 to 60% by weight of polyamide and 50 to 40% by weight of elastomer or elastomers.

The amount of masterbatch which is generally used to produce the final composition according to the invention ranges from 20 to 90%, expressed as a percentage by weight of masterbatch in the final composition of masterbatch+copolyamide (1) which is to be modified. Preferably, if the polyamide in the masterbatch is a semirigid polyamide (1), this quantity ranges from 30 to 80%, while if the polyamide in the masterbatch is a conventional polyamide (3), this quantity ranges from 30 to 60%.

Yet another method of preparation of the compositions of the invention can consist of polymerizing the monomers which form the semirigid copolyamide in the presence of the elastomer employed, and the polymerization can be carried out in a mold cavity having the shape of the desired final article.

In order to further illustrate the present invention and the advantages thereof, the following specific examples are given, it being understood that same are intended only as illustrative and in nowise limitative.

In said examples to follow, a certain number of controls on the primary constituents and on the compositions according to the invention were carried out. The procedures or standard specifications according to which these controls were carried out are indicated below.

(I) Glass transition:

The glass transition temperature corresponded to the abrupt drop in the modulus of shear as a function of temperature. It can be determined from the graph showing the variation of the torsional modulus as a function of temperature, the variation being measured by thermomechanical analysis using an automatic torsional pendulum.

(II) Torsional modulus:

This was determined at four temperatures, namely, 23° C., 0° C., −20° C. and −30° C., using an automatic torsional pendulum, at a frequency on the order of 1 Hertz, in accordance with standard specification ISO R 537. The samples were conditioned at EHO, namely, same were placed in a desiccator over silica gel and dried for 24 hours at ambient temperature under 0.66 to $1.33 \times 10^2$ Pa before the measurements were carried out. The results are expressed in Mpa.

(III) Determination of the intrinsic viscosity:

0.5% of the dried polymer was dissolved in metacresol. The flow time of this solution was measured relative to that of the pure solvent. The value of the intrinsic viscosity is given by the formula:

$$\eta inh. = 4.6 \ (log \ t_1 - log \ t_o)$$

$t_1$ = flow time of the solution
$t_o$ = flow time of the solvent
It is expressed in dl/g.

(IV) Melting points:

The melting points (° C.) were determined by differential microcalorimetry (10° C/min under nitrogen).

(V) Determination of end groups:

$NH_2$: Automatic potentiometric determination, with HCl, on the polymer solution in a 90/10 (by weight) mixture of phenol and water. The result is given in milligram-equivalents per $10^3$ g of polymer.

COOH: The polymer was dissolved hot, under a nitrogen atmosphere, in benzyl alcohol and acidimetric determination under nitrogen was carried out on this hot solution with a solution of potassium hydroxide in glycol, in the presence of phenolphthalein. The result is expressed in milligram-equivalents per $10^3$ g of polymer.

(VI) Melt viscosity:

This determination was carried out by means of a DAVENPORT rheometer or an INSTRON capillary rheometer.

(VII) Flexural modulus at EHO and at 23° C.:

This determination was carried out on bar-type samples of size $100 \times 10 \times 4$ mm in accordance with standard specification NFT 51,001. The results are expressed in Mpa.

(VIII) CHARPY impact strength at EHO:

This was determined at two temperatures, namely, 23° C. and −30° C., on bar-type samples of size $60 \times 10 \times 4$ mm with (notched impact strength) or without (plain impact strength) U-notches, in accordances with standard specification NFT 51,035. The results are expressed in $kj/m^2$.

(IX) Viscosity index:

This determination was carried out in accordance with standard specification ISO-307-1977.

(X) SHORE D hardness at EHO and at 23° C.:

This determination was carried out in accordance with standard specification NFT 51,109.

EXAMPLE 1

Preparation of an ethylene/propylene/hexa-1,4-diene elastomer grafted with maleic anhydride 10 g of an ethylene/propylene/hexa-1,4-diene elastomer marketed by DuPont de Nemours under the registered trademark NORDEL 2 744 (exhibiting a glass transition temperature of −50° C., a torsional modulus at 23° C. of 3 Mpa, and apparent viscosities, at 250° C., of 23,000 poises and 6,000 poises, respectively, for velicity gradients of 100 $s^{-1}$ 1,000 $s^{-1}$, were ground and mixed, in the solid state, with 50 g of maleic anhydride powder.

The foregoing mixture was introduced into the hopper of a Thoret Laboratory single-screw extruder having a screw diameter D of 20 mm and a length of 20 D, and the mixture was extruded under the following conditions:

(i) heating zone and head zone temperature: 300° C.;
(ii) pressure at extruder head, regulated by means of a diaphragm device: 20 Mpa;
(iii) mean residence time: about 4 min.

The extruded product was granulated and the free maleic anhydride was removed by a devolatilization treatment in an oven at 120° C. under a pressure of $2.66 \times 10^2$ Pa for 2 hours.

After hydrolysis of the anhydride groups, the elastomer obtained had an acidity, expressed as the number of carboxylic acid groups per gram of elastomer, of $0.07 \times 10^{-3}$.

EXAMPLE 2

Preparation of a semirigid copolyamide from a fatty acid dimer, hexamethylenediamine and caprolactam (1) Preparation of the salt of hexamethylenediamine and the dimeric acid as a 35% by weight solution in a 65/35 (by weight) mixture of water and caprolactam:

The following materials were introduced into a 150 liter reactor which could operate under a nitrogen atmosphere and was equipped with a spiral stirrer (three vanes; speed of rotation, 300 rpm) and a metering device permitting the introduction of a liquid:
(i) ion-exchanged water: 31,690 g
(ii) caprolactam: 17,063 g
(iii) pure hexamethylenediamine: 4,455 g The mixture was homogenized for about one hour and the free space of the reactor was flushed with nitrogen. 21,834 g of a batch of fatty acid dimer, marketed by Unilever Emery under the registered trademark Empol 1010 and having a monomer content which was not detectable by chromatography of the methyl esters, were introduced into the stirred solution by uniformly introducing same therein over about one hour. The mixture was then homogenized for one hour.

To check the stoichiometry of the salt obtained, a small sample was taken and was diluted with a mixture of water and caprolactam (77.6/22.4 by weight) such as to adjust the concentration of the salt to 10% by weight. The pH value of the diluted solution at 20° C. was, within five hundredths of a pH unit, that of the pH at the equivalence point.

The concentrated solution of the salt was maintained under a nitrogen atmosphere at 25° C.

(2) Preparation of the copolyamide:

The apparatus used consisted of:

(i) a 200 liter reactor equipped with a system of heating by means of a heat-transfer fluid, a stirrer (three-vane spiral; speed of rotation, 300 rpm), a distillation column and a system which permitted flushing with nitrogen, connected by means of a heat-insulated pipeline to:

(ii) a 100 liter autoclave equipped with a system of heating by means of a heat-transfer fluid, a frame-type stirrer revolving at 16 rpm, a circuit for condensing and collecting the volatile products and also permitted the application of vacuum by means of vapor ejectors, and a system which permitted flushing with nitrogen.

42,820 g of the 35% strength salt solution prepared above were introduced into the 200 liter reactor preheated to 50° C. The solution was homogenized for 15 minutes and 50,000 g of a 60% strength by weight aqueous caprolactam solution were introduced. After homogenizing the batch for 15 minutes, 875 g of the dimeric acid Empol 1010 (chain terminator) and 30 cm$^3$ of a 6% strength solution of an anti-foam agent in tetrachloroethylene were introduced. The mixture was flushed three times with nitrogen by placing it under a pressure of $3.10^5$ Pa and then releasing the pressure. The temperature of the stirred mass was gradually raised to about 116° C. over one hour while ensuring uniform distillation through the column. The temperature of the mixture was maintained at about 116° C. until the weight of distillate reached 31,900 g.

Stirring was then stopped, a pressure of $2.10^5$ Pa of nitrogen was applied and the material was discharged from the reactor into the 100 liter autoclave preheated to 150° C. and flushed with nitrogen.

The temperature of the stirred mixture in the autoclave was gradually raised to 270° C. over two hours while ensuring uniform distillation.

The mixture was maintained at 270° C. for about minutes, under stirring. Thereafter, a pressure of $93.1 \times 10^2$ Pa was gradually established over about 30 minutes, while maintaining the mixture homogenized at 260° C.–270° C. under a pressure of $93.1 \times 10^2$ Pa, stirring was then stopped, a nitrogen pressure of $5 \times 10^5$ Pa was then established in the autoclave and the polymer was discharged. The polymer, extruded from the autoclave in the form of strands, was cooled by passing same through a cold water bath and was then granulated and dried.

The polymer obtained was transparent but slightly opalescent and exhibited the following properties:

| (i) | Intrinsic viscosity in metacresol | 1.01 dl/g |
|---|---|---|
| (ii) | Melting point | 200° C. |
| (iii) | NH$_2$ end groups (milliequivalents/kg) | 8.1 |
| (iv) | COOH end groups (milliequivalents/kg) | 70.0 |
| (v) | Residual caprolactam content | 3% |
| (vi) | Melt viscosity at 230° C. ($\gamma = 10 \, s^{-1}$) | 5,100 poises |

The mechanical properties measured on injection-molded samples therefrom are reported in Table 1.

EXAMPLE 3

Preparation of a semirigid copolyamide from a fatty acid dimer, adipic acid and hexamethylenediamine (1) Preparation of the salt of hexamethylenediamine and the dimeric acid in emulsion in an aqueous hexamethylenediamine adipate solution:

The following materials were introduced into a 150 liter reactor which was capable of operating under a nitrogen atmosphere and was equipped with a spiral stirrer (three vanes: speed of rotation, 300 rpm) and a metering device permitting the introduction of a liquid:

| (i) | ion-exchanged water | 23,000 g |
|---|---|---|
| (ii) | crystalline hexamethylenediamine adipate (N salt) | 16,692 g |

The mixture was stirred at 25° C. until the N-salt had dissolved completely. 5,512 g of a 30.8% by weight aqueous hexamethylenediamine solution were introduced and the mixture was homogenized at 25° C. for 10 minutes.

Thereafter, 8.434 g of the fatty acid dimer Empol 1010 from Unilever Emery, having a monomer content which was not detectable by chromatography of the methyl esters, were introduced slowly, with stirring, over about one hour.

The emulsion obtained was stirred for two hours.

To check the stoichiometry of the salt obtained, 20 g of emulsion were taken and diluted with 17.8 g of a water/isopropanol mixture (21.9/78.1 by weight) such as to adjust the concentration of the salt of the dimeric acid to 10% by weight. The pH value of the diluted solution at 20° C. was 8.47 and corresponded to within .0.1 pH unit to the value of the pH at the equivalence point.

(2) Preparation of the copolyamide:

The apparatus used was of the same type as that used for the preparation of the copolyamide of Example 2, but with a reactor of 100 liter capacity and an autoclave of 50 liter capacity.

40,230 g of the preceding salt emulsion and 30 cm$^3$ of a 6% by weight solution of an anti-foam agent in tetrachloroethylene were introduced into the 100 liter reactor preheated to 50° C. Three flushes with nitrogen were carried out by applying a pressure of $3.10^5$ Pa and then releasing the pressure. The temperature of the stirred mixture was gradually raised over 1.5 hours such as to remove uniformly 9,300 g of distillate.

The reactor was placed under a pressure of $2.10^5$ Pa of nitrogen and the mixture was rapidly transferred from the reactor into the 50 liter autoclave flushed with nitrogen and preheated to 250° C. The heating of the autoclave was regulated such as to provide an autogenous pressure of $18.10^5$ Pa and water was then distilled under $18.10^5$ Pa for one hour such as to provide a material temperature of 280° C., the stirring being commenced when the material temperature reached 250° C.

Thereafter, the distillation was terminated to carry out a homogenization stage for 2.5 hours at 280° C. under a pressure of $18.10^5$ Pa.

The pressure was then released down to atmospheric pressure over 30 minutes while maintaining the temperature at 270° C.-280° C., and thereafter the mixture was kept stirred at atmospheric pressure at 270° C.-280° C. for 30 minutes.

The stirring was then stopped, a nitrogen pressure of $5.10^5$ Pa was established in the autoclave and the polymer was discharged. The polymer extruded from the autoclave in the form of strands, was cooled by passing same through a cold water bath and was then granulated and dried.

The polymer obtained was translucent and had the following properties:

| | | |
|---|---|---|
| (i) | Intrinsic viscosity in meta-cresol | 0.93 dl/g |
| (ii) | Melting point | 246° C. |
| (iii) | NH$_2$ end groups (milli-equivalents/kg) | 44.1 |
| (iv) | COOH end groups (milli-equivalents/kg) | 74.4 |
| (v) | Melt viscosity at 260° C. ($\gamma = 10 \text{ s}^{-1}$) | 2,250 poises |

The mechanical properties measured on injection-molded samples thereof are reported in Table 1.

EXAMPLE 4

Preparation of a composition according to the invention from the semirigid copolyamide of Example 2 and the elastomer of Example 1

A mixture of 80 parts by weight of granules of the copolyamide of Example 2 and of 20 parts by weight of the elastomer with functional groups of Example 1, was prepared. The mixture of granules was dried for 15 hours at 50° C. under a pressure of $1.33 \times 10^2$ Pa.

The mixture of dry granules was extruded on a Werner-Pfleiderer type ZSK 30 extruder with twin corotating screws and equipped with 5 malaxating zones, the extrusion conditions being as follows:
 (i) temperatures: 240° C.-245° C.
 (ii) screw speed: 200 rpm
 (iii) throughput: 9.6 kg/h The extruded product was collected in the form of strands, cooled by passing same through a cold water bath and then granulated and dried.

The properties measured on injection-molded samples thereof are reported in Table 1. The molded samples had a very good surface and great flexibility at low temperature, coupled with high mechanical strength.

EXAMPLE 5

Preparation of a composition according to the invention from the semirigid copolyamide of Example 3 and the elastomer of Example 1

The operations of Example 4 were repeated, replacing the copolyamide of Example 2 with that of Example 3 and carrying out the extrusion of the mixture of granules under the following conditions:
 (i) temperatures: 260° C.-265° C.
 (ii) screw speed: 200 rpm
 (iii) throughput: 15.6 kg/h The samples injection-molded from the composition obtained had an attractive surface appearance, and good flexibility at low temperatures, together with high mechanical strength. The properties measured on molded samples thereof are reported in Table 1.

TABLE 1

| | ELASTOMER PHASE | | | MECHANICAL PROPERTIES AT EHO | | | | | | | | |
|---|---|---|---|---|---|---|---|---|---|---|---|---|
| | | | | Flexural modulus in MPa | Torsional modulus in MPa | | | | CHARPY impact strength kJ/m$^2$ | | | |
| | | Content | Particle size | | | | | | notched | | plain | |
| EXAMPLE | Nature | % | in μm | 23° C. | 23° C. | 0° C. | −20° C. | −30° C. | 23° C. | −30° C. | 23° C. | −30° C. |
| 2 (comparison) | Example 2 | | | 860 | 420 | 580 | 635 | 660 | 23.6 | 3.6 | NB* | 23.7 |
| 4 (composition) | | 20 | 0.1–1.5 | 460 | 300 | 480 | 515 | 540 | 50 | 20 | NB | NB |
| 3 (comparison) | Example 3 | | | 1100 | 500 | 550 | 610 | 650 | 16.5 | 2.4 | NB | 35 |
| 5 (composition) | | 20 | 0.1–1.5 | 820 | 400 | 480 | 530 | 560 | 41.3 | 21.5 | NB | NB |

*NB means: not broken

EXAMPLE 6

Preparation of an elastomer of the copolyester-amide type

A polyether-ester-amide of the type as described in Example 5 of French Patent Application No. 79/30,650, published under No. 2,471,394, was prepared.
(1) Preparation of the prepolyether-ester by condensation of the dimeric acid Empol 1010 and polytetrahydrofuran of molecular weight 1,000 (Poly THF MW 1,000):

The following reactants were introduced into a 7.5 liter stainless steel autoclave:

| | |
|---|---|
| (i) dimeric acid, Empol 1010 from Unilever Emery | 2,882.5 g |
| (ii) poly THF MW 1,000, registered trademark TERACOL 1000 | 2,312.5 g |

The autoclave was carefully flushed with nitrogen and the mixture was stirred and its temperature increased to 250° C. over the course of 2 hours. A vacuum was then applied over one hour, down to a pressure of $0.66 \times 10^2$ Pa. The mixture was maintained for 2 hours at 250° C. under $0.66 \times 10^2$ Pa. Same was then placed under a nitrogen atmosphere, cooled to 120° C. and discharged in the form of a colorless liquid prepolymer.

Determination of the carboxylic acid groups on the prepolyether-ester evidenced 0.101 COOH/100 g.

(2) Preparation of the prepolyamide by condensing the dimeric acid Empol 1010, sebacic acid and hexamethylene The following reactants were introduced into a 7.5 liter stainless steel autoclave:

| (i) | dimeric acid, Empol 1010 from Unilever Emery | 1,596.2 g |
|---|---|---|
| (ii) | sebacic acid | 1,305 g |
| (iii) | pure crystalline hexamethylenediamine | 867 g |

The autoclave was carefully flushed with nitrogen and the temperature of the mixture was increased to 275° C. over 2 hours, under stirring. The mixture was maintained at 275° C., under stirring, for one hour and the prepolymer was then discharged into water. The prepolyamide was drained, ground and dried at 100° C. in a vacuum oven. Its properties were as follows:
(i) COOH end groups: 866.5 milliequivalents/kg
(ii) NH$_2$ end groups: 4.1 milliequivalents/kg (3) Preparation of the polyether-ester-amide elastomer:

The following materials were introudced into a 7.5 liter stainless steel autoclave:

| (i) | prepolyether-ester obtained above | 2,500 g |
|---|---|---|
| (ii) | prepolyamide obtained above | 971 g |
| (iii) | ethylene glycol | 228 g |
| (iv) | catalyst based on triethanolamine titanate | 2.1 g |

The apparatus was carefully flushed with nitrogen and the temperature was increased to 260° C. over two hours and then maintained at this value for one hour. A vacuum was then established over 75 min. until the pressure reached $0.19 \times 10^2$ Pa. Polycondensation was carried out under $0.19 \times 10^2$ Pa at 260° C. for 105 min. A nitrogen pressure of $5.10^5$ Pa was then established and the polymer was discharged, cooled in water, passed through a mixture of acetone and dry ice, then granulated and dried.

The properties of the elastomer obtained were as follows:

| (i) | Intrinsic viscosity in m-cresol | 1.08 dl/g |
|---|---|---|
| (ii) | Torsional thermomechanical properties measured with an | |

| automatic pendulum at EHO | |
|---|---|
| glass transition temperature Tg | −74° C. |
| torsional modulus at 23° C. | 13 Mpa |
| torsional modulus at −30° C. | 24 Mpa |
| melt viscosity at | |
| 230° C. (Υ = 10 s$^{-1}$) | 4,670 poises |
| 260° C. (Υ = 10 s$^{-1}$) | 1,250 poises |

EXAMPLE 7

Preparation of a composition according to the invention from the semirigid copolyamide of Example 2 and the elastomer of Example 6

A mixture of 50 parts by weight of granules of the copolyamide of Example 2 and 50 parts by weight of granules of the polyether-ester-amide elastomer of Example 6 was dried at 50° C. under a pressure of $1.33 \times 10^2$ Pa for 15 hours and then extruded on a Thoret laboratory extruder having a screw diameter D of 20 mm and a length of 20 D, under the following operation conditions:

(i) temperatures: 230° C.
(ii) pressure at extruder head: 15 Mpa
(iii) screw speed: 79 rpm The extruded product was collected in the form of strands, cooled by passing same through a cold water bath and then granulated and dried. The properties measured on injection-molded samples thereof are reported in Table 2.

EXAMPLE 8

Preparation of a composition according to the invention from the semirigid copolyamide of Example 2 and the elastomer of Example 6

A mixture of 60 parts by weight of granules of the copolyamide of Example 2 and 40 parts by weight of granules of the composition obtained in Example 7 (a 50/50 by weight mixture of the copolyamide of Example 2 and the elastomer of Example 6, which thus served as a materbatch) was dried at 80° C. under a pressure of $1.33 \times 10^2$ Pa for 15 hours and extruded on a Thoret laboratory extruder ($\phi$20–20D) under the following operating conditions:

(i) temperatures: 230° C.
(ii) pressure at extruder head: 12 Mpa
(iii) screw speed: 70 rpm The product was collected as in Example 7 and injection-molded samples thereof exhibited the properties reported in Table 2.

TABLE 2

| | ELASTOMER PHASE | | | MECHANICAL PROPERTIES AT EHO | | | | |
|---|---|---|---|---|---|---|---|---|
| | | Content % by | Particle size | Flexural modulus in MPa | Torsional modulus in MPa | | | |
| EXAMPLE | Nature | weight | in μm | 23° C. | 23° C. | 0° C. | −20° C. | −30° C. |
| 2 (comparison) | | 0 | | 860 | 420 | 580 | 635 | 660 |
| 7 | Example 6 | 50 | 0.1–0.6 | 160 | 70 | 85 | 105 | 130 |
| 8 | Example 7 | 50 | 0.05–0.4 | 510 | 280 | 400 | 450 | 465 |

EXAMPLE 9

Preparation of a composition according to the invention from the semirigid copolyamide of Example 2 and an elastomer of type (2g)

A copolymer of butadiene and methyl methacrylate, having a "core and skin" structure, was obtained by emulsion polymerization in two stages: during the first stage, a mixture of buta-1,3-diene and methyl methacrylate in the weight ratio of 78/22 was copolymerized in emulsion. In the second stage, 25 parts by weight of methyl methacrylate were emulsion-polymerized onto 75 parts by weight of the preceding copolymer.

The latex obtained on exiting the second stage consisted of particles of mean size 0.2 μm. It was coagulated and the copolymer separated off and then dried. The copolymer obtained had glass transition temperatures at −55° C. and +75° C., respectively, for the "core" and "skin" phases, and had a torsional modulus of 90 Mpa at 23° C.

A mixture of 80 parts by weight of granules of the copolyamide of Example 2 and 20 parts by weight of the butadiene/methyl methacrylate copolymer powder was dried at 80° C. under a pressure of $1.33 \times 10^2$ Pa for 15 hours and then extruded on a Werner-Pfleiderer ZSK 30 twin-screw extruder having 5 malaxating zones, at a temperature of about 250° C. and with a throughput of 10 kg/h.

The extruded product was collected in the form of strands, cooled by passing same through a cold water bath, granulated and dried.

The properties measured on injection-molded samples thereof were as follows:
  (i) Flexural modulus at EHO at 23° C.: 540 Mpa
  (ii) Torsional module at EHO at 23° C.: 250 Mpa
  (iii) Torsional module at EHO at −23° C.: 500 Mpa

EXAMPLE 10

Preparation of a composition according to the invention by introducing a latex of type (2g) into the medium for the preparation of the semirigid copolyamide of Example 2

A copolymer prepared in emulsion of 50% concentration by weight from the following monomers:
  (i) butadiene: 60% by weight
  (ii) styrene: 36% by weight
  (iii) acrylic acid: 3% by weight
  (iv) fumaric acid: 1% by weight
had the following properties:

| (i) | Particle size | 0.15 μm |
|---|---|---|
| (ii) | Acidity expressed in milli-equivalents of COOH/kg | 475 |
| (iii) | Glass transition temperature | −31° C. |
| (iv) | Torsional modulus at EHO at 23° C. | 1.3 Mpa |

The 50% strength latex of the copolymer was neutralized with a 10% strength aqueous potassium hydroxide solution to adjust the pH of the latex (at 20° C.) to 7.35.

The following reactants were introduced into a small glass reactor, of size 250 ml, equipped with an anchor-type stirrer, a tube for distillation of the volatile products and a system which permitted the column of the reactor to be flushed with nitrogen:

| (i) | a 35% strength solution of the salt of hexamethylenediamine and the dimeric acid in 65/35 (by weight mixture of water and caprolactam, the solution being prepared as indicated in Example 2 | 42.8 g |
|---|---|---|
| (ii) | 60% strength aqueous caprolactam solution | 44.8 g |
| (iii) | 50% strength latex of the neutralized copolymer | 24.7 g |

The mixture was homogenized and the free space of the reactor was flushed with nitrogen. The temperature of the mixture was gradually raised to 270° C. over 1.5 hours, under stirring and ensuring uniform distillation. The polymer was maintained stirred at 270° C. for 45 minutes and was then cooled.

The polymer recovered was ground and washed for 8 hours in boiling water, then drained and dried for 15 hours at 80° C. under a vacuum of $1.33 \times 10^2$ Pa.

The polymer obtained, containing 20% by weight of the butadiene copolymer, was compression-molded by 230° C. under a pressure of 40 Mpa.

The properties determined on samples were as follows:
  (i) Torsional modulus at EHO at 20° C.: 220 Mpa
  (ii) Torsional modulus at EHO at 20° C.: 500 Mpa

EXAMPLE 11

Preparation of a composition according to the invention from a semirigid copolyamide of the type of Example 2, an elastomer of the type of Example 1 and a conventional polyamide consisting of nylon 6, using the method of introduction employing a masterbatch based on nylon 6

The semirigid copolyamide employed in this example was prepared in a 500 liter autoclave (stirred at 32 rpm) conforming to the general pattern described in Example 2. This polymer had the following properties:

| (i) | Intrinsic viscosity in metacresol | 0.99 dl/g |
|---|---|---|
| (ii) | Viscosity index in 95% strength formic acid | 111 ml/g |
| (iii) | NH$_2$ end groups (milli-equivalents/kg | 10.5 |
| (iv) | COOH end groups (milli-equivalents/kg) | 58.2 |
| (v) | Melt viscosity at 230° C. (Y:10 s$^{-1}$) | 5,100 poises |

The elastomer employed in this case was prepared in accordance with the general scheme described in Example 1. The elastomer obtained had, after hydrolysis of the anhydride groups, an acidity corresponding to $0.075 \times 10^{-3}$ carboxylic acid groups per gram of elastomer.

The nylon 6 employed in this example was the product marketed by BAYER under the registered trademark DURETHAN BK 31, and had a viscosity index of 142 ml/g in 90% strength formic acid.

(1) Compounding a masterbatch from nylon 6 and the elastomer:

A dry blend of 55 parts by weight of polyamide 6 granules with 45 parts by weight of elastomer granules was prepared in a MORITZ mixer.

This mixture was subsequently extruded on a PRODEX devolatilizing extruder having a screw diameter D of 65 mm and a length of 24 D, and equipped with a cylindrical-conical screw having a profile suitable for processing polyamides, and a die with two holes of 5 mm diameter. The extrusion conditions were as follows:

| (i) | temperatures | 250° C.–300° C. |
|---|---|---|
| (ii) | pressure at the end of the screw | $50.10^5$ Pa |
| (iii) | vacuum | $994.10^2$ Pa |
| (iv) | screw speed | 78 rpm |
| (v) | throughput | 39.6 kg/h |

The product collected in the form of strands was cooled by passing same through a cold water bath and was then granulated and dried. This masterbatch had the following analytical properties: viscosity index of the soluble fraction in 90% strength formic acid: 160 ml/g; residual water content: 0.12% by weight. Observation by transmission under an optical microscope and an electron microscope evidenced that the elastomer was homogeneously distributed in the polyamide 6, the dispersion being fine and the largest particles having a size well below 1 mm.

(2) Preparation of a comparison formulation:

The semirigid copolyamide was mixed with various additives which facilitated processing and improved the performance of the polymer on exposure to degrading agents such as oxygen, heat and light. These additives and their proportions in the mixture were as follows:

(i) lubricant and mold release agent (zinc stearate+ester wax): 0.75% by weight (relative to the polyamide matrix)
(ii) nucleating agent (talc): 0.2% by weight
(iii) oxidation stabilizer and heat stabilizer (sterically hindered phenol): 0.5% by weight
(iv) ultraviolet stabilizer (benzotriazole+sterically hindered amine of the piperidine category): 0.5 % by weight.

The mixture was prepared in a MORITZ mixer and was then homogenized by extrusion on the PRODEX devolatilizing extruder referred to above, under the following conditions:

| (i) | temperatures | 210° C.–250° C. |
|---|---|---|
| (ii) | pressure at the end of the screw | $10.10^5$ Pa |
| (iii) | vacuum | $957.10^2$ Pa |
| (iv) | screw speed | 66 rpm |
| (v) | throughput | 46.8 kg/h |

The extruded mixture was collected in the form of strands which were cooled by passing same through a cold water bath and were then granulated and dried. It had the following analytical properties: intrinsic viscosity in meta-cresol: 1 dl/g; residual water content: 0.17%.

Samples were molded, and the physico-mechanical properties measured are reported in Table 3.

(3) Preparation of a composition according to the invention from the semirigid copolyamide and the masterbatch compounded above:

To commence, a dry premix was prepared in a MORITZ mixer from 55 parts by weight of granules of the semirigid copolyamide with 45 parts by weight of granules of the masterbatch. The processing-aid additives and protective additives used in the preparation of the comparison formulation were then added to this premix.

The final mixture was extruded on the PRODEX devolatilizing extruder described above, under the following conditions:

| (i) | temperatures | 250° C.–310° C. |
|---|---|---|
| (ii) | pressure at the end of the screw | $30.10^5$ Pa |
| (iii) | vacuum | $957.10^2$ Pa |
| (vi) | screw speed | 40 rpm |
| (v) | throughput | 32.7 kg/h |

The extruded product, collected in the form of strands, was cooled under cold water and then granulated and dried. It had the following analytical properties: viscosity index of the soluble fraction in 95% strength formic acid: 146 ml/g; residual water content: 0.975%; melt viscosity at 240° C. ($\gamma = 10$ s$-1$): 40,000 poises. Observation by transmission, under an electron microscope, evidenced that the elastomer was homogenously distributed in the mixture of the two polyamides, the dispersion being fine and the largest particles having a size of less than 1 μm.

The physico-mechanical properties measured on injection-molded samples thereof are reported in Table 3.

TABLE 3

| | COMPOSITION | | TEMPERATURES OF MEASUREMENT IN °C. | MECHANICAL PROPERTIES AT EHO | | | |
|---|---|---|---|---|---|---|---|
| | | Content of elastomeric phase, % by weight | | Flexural modulus in MPa | CHARPY impact strength in kJ/m² | | SHORE D hardness |
| EXAMPLE | Polyamide(s) matrix | | | | notched | plain | |
| 11 (comparison) | Semi-rigid copolyamide, 100% | 0 | 23<br>−20 | 650<br>2,280 | 10<br>2.5 | NB**<br>55% NB | 71 |
| 11 (composition according to the invention) | Semi-rigid copolyamide, (69%) nylon 6 (31%) | 20.25 | 23<br>−25<br>−40 | 900<br>1,495 | 47.6* (50%)<br>12.1<br>6.8 | NB<br>NB<br>NB | 71 |

*The sample tears partially without breaking. The value indicated hence does not indicate a true resilience but, by way of indication, a bending resistance. The amount, in %, of the tear relative to the height under the notch of the bar is shown in parentheses.
**NB denotes: not broken.

EXAMPLE 12

Preparation of a composition according to the invention from the semirigid copolyamide and the elastomer employed in Example 11, using the technique of introduction which employed a masterbatch based on the above-mentioned semirigid copolyamide (1) Compounding the masterbatch from the copolyamide and the elastomer:

A dry blend of 55 parts by weight of granules of the copolyamide with 45 parts by weight of granules of the elastomer was prepared in a MORTIZ mixer.

This mixture was then extruded on the PRODEX apparatus described in Example 11 above, under the following conditions:

| (i) | temperatures | 225° C.–265° C. |
|---|---|---|
| (ii) | pressure at the end of the screw | $25.10^5$ Pa |
| (iii) | vacuum | $957.10^2$ Pa |
| (iv) | screw speed | 51 rpm |
| (v) | throughput | 33 kg/h |

The extruded product was collected in the form of strands, cooled under cold water and then granulated and dried.

(2) Preparation of a composition according to the invention from the semirigid copolyamide and the masterbatch compounded above:

To commence, a dry premix was prepared in a MORITZ mixer from 55 parts by weight of granules of the semirigid copolyamide with 45 parts by weight of masterbatch granules. The same processing-aid additives and protective additives as those employed in stages (2) and (3) described in Example 11 above were then added to this premix (the proportions of these additives were also the same and were as indicated in stage (2) of Example 11).

The final mixture was extruded on the PRODEX extruder under the following conditions:

| (i) | temperatures | 225° C.–165° C. |
|---|---|---|
| (ii) | pressure at the end of the screw | $10.10^5$ Pa |
| (iii) | vacuum | $957.10^2$ Pa |
| (iv) | screw speed | 50 rpm |
| (v) | throughput | 30.6 kg/h |

The extruded product was collected in the form of strands, cooled under cold water and then granulated and dried. It had the following analytical properties: viscosity index of the soluble fraction in 95% strength formic acid: 112 ml/g; residual water content: 0.09%. The mechanical properties measured on injection-molded samples thereof are reported in Table 4.

(3) Comparison formulation:

Cf. stage (2) described in Example 11, above.

EXAMPLE 13

Preparation of a composition according to the invention from the semirigid copolyamide and the elastomer employed in Example 11, using the direct introduction technique described in Example 4, but in this instance by mixing the ingredients on a single-screw extruder in place of a twin-screw extruder A dry blend of 80 parts by weight of granules of the semirigid copolyamide with 20 parts by weight of granules of the elastomer was prepared in a MORTIZ mixer. The same processing-aid additives and protective additives as those used for the preparation of the formulations described in Examples 11 and 12 were then added, in the same proportions, to this premix, and the final mixture was extruded on the PRODEX single-screw extruder used in Examples 11 and 12 above; the extruder operating conditions were as follows:

| (i) | temperatures | 225° C.–265° C. |
|---|---|---|
| (ii) | pressure at the end of the screw | $25.10^5$ Pa |
| (iii) | vacuum | $957.10^2$ Pa |
| (iv) | screw speed | 46 rpm |
| (v) | throughput | 26.7 kg/h |

The extruded product was collected in the form of strands, cooled under cold water and then granulated and dried. It had the following analytical properties: viscosity index of the soluble fraction in 95% strength formic acid: 114 ml/g; residual water content 0.09%. The mechanical properties measured on injection-molded samples thereof are reported in Table 4 below.

TABLE 4

| | COMPOSITION | | | TEMPERATURES OF MEASUREMENT, IN °C. | MECHANICAL PROPERTIES AT EHO | | |
|---|---|---|---|---|---|---|---|
| | | | | | CHARPY impact strength in kJ/m² | | SHORE D HARDNESS |
| EXAMPLE | Polyamide(s) matrix | Content of elastomeric phase, % by weight | Technique of introduction of the elastomer | | notched | plain | |
| Comparison (comparison Example 11) | Semi-rigid copolyamide 100% | 0 | — | 23<br>−20 | 10<br>2.5 | NB**<br>55% NB | 71 |
| 12 | Semi-rigid copolyamide 100% | 20.25 | masterbatch in semi-rigid copolyamide | 23<br>−25 | 51.5*(28%)<br>12.4 | NB<br>NB | 68 |
| 13 | Semi-rigid copolyamide 100% | 20 | direct mixture | 23<br>−25 | 14.9<br>8.5 | NB<br>NB | 60 |

\* and \*\*: cf. footnotes to Table 3 above.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A polyamide-based molding composition having high flexibility and resilience even at low temperatures, comprising:

(1) a semirigid copolyamide prepared from (a) a fatty acid dimer, hexamethylenediamine and caprolactam or (b) a fatty acid dimer, adipic acid and hexamethylenediamine wherein the dimeric acids are prepared by polymerization of mixtures comprising a major proportion of monomeric fatty acids having from 16 to 20 carbon atoms and a minor proportion of monomeric fatty acids having from 8 to 15 carbon atoms, 21 to 24 carbon atoms or a combination thereof;

(2) at least one elastomer comprising recurring units compatible with or reactive with the copolyamide (1) and selected from among:

(a) olefinic copolymers consisting essentially of an aliphatic α-olefin containing from 2 to 6 carbon atoms and at least one α,β-unsaturated monocarboxylic or dicarboxylic acid comonomer containing from 3 to 8 carbon atoms, a lower alkyl ester thereof, or an anhydride thereof;

(b) olefinic copolymers consisting essentially of a conomoner containing carboxyl groups, a comonomer containing carboxylate groups or a combination thereof, ethylene and at least one α-olefin having from 3 to 6 carbon atoms;

(c) olefinic copolymer consisting essentially of a comonomer containing carboxyl groups, a comonomer containing carboxylate groups or a combination thereof, ethylene, at least one α-olefin having from 3 to 6 carbon atoms and at least one non-conjugated aliphatic diene containing at least 5 carbon atoms;

(d) copolyester-amides comprising (i) an acid compound containing 1 to 100 mole % of a diacid or derivative thereof having from 15 to 60 carbon atoms and 0 to 99 mole % of at least one other difunctional comonomer selected from among diacids, aminoacids, hydroxyacids or other ester- or amide-forming derivatives thereof, such comonomers having a number of carbon atoms at most equal to 12, (ii) a dihydroxylic compound which can be a linear, branched or cyclic diol having from 2 to 8 carbon atoms, a macromolecular dihydroxlic compound having a molecular weight ranging from 500 to 5,000 or a combination thereof, and (iii) an amine compound comprising at least one diamine, at least one aminoalcohol having a number of carbon atoms at most equal to 25 or a combination thereof, with the proviso that the compound (iii) may be omitted where the acid compound (i) already comprises an amino function:

(e) polyurethanes comprising (i) an aliphatic polyester, an aliphatic polyether having a terminal hydroxyl group and having a molecular weight ranging from 500 to 4,000 or a combination thereof, (ii) an aliphatic diol containing 2 to 8 carbon atoms and (iii) an aromatic diisocyanate;

(f) organopolysiloxane and polyurethane block copolymers comprising a reaction product of (i) and (ii) which are different and where (i) is a polysiloxane macrodiol or polysiloxane macrodiisocyante which comprises a reaction product of an α, ω-hydrogenopolysiloxane of the formula:

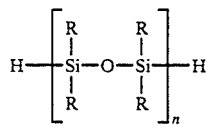

in which n is a number ranging from 10 to 80 and the substituents R, which may be identical or different, represent methyl, vinyl or phenyl groups, with a primary ethylenically unsaturated monoalcohol or ethylenically unsaturated monoisocyanate and (ii) is a low molecular weight diol and a low molecular weight diisocyanate;

(g) copolymers of unsaturated monomers, having at least one elastomeric phase and comprising particulates of a size ranging from 0.05 to 1.5 μm prepared by emulsion polymerization of an alkyl acrylate, an alkyl methacrylate or a conjugated aliphatic diene, and at least one unsaturated comonomer which bears a carboxylic acid group or derivative thereof, amine group or derivative thereof, nitrile group, sulfonic acid group or derivative thereof; and (3) a conventional polyamide in an amount ranging from 10 to 50% by weight of the combination of the semirigid copolyamide (1) and the conventional polyamide (3).

2. The polyamide-based composition as defined by claim 1, wherein the semirigid copolyamide (1) is prepared from a mixture comprising a salt of a fatty acid dimer with hexamethylenediamine and caprolactam, said salt being in the form of a solution in a solvent based on a mixture of water and an alcohol having fewer than 5 carbon atoms, a mixture of water and caprolactam or caprolactam itself, the stoichiometry of the said salt being rigorously controlled by measuring the pH thereof.

3. The polyamide-based composition as defined by claim 1, wherein the semirigid copolyamide (1) is prepared from a fatty acid dimer, adipic acid and hexamethylenediamine, the molar ratio of adipic acid to the total amount of acid ranging from 0.5 and 0.99, and said preparation being under conditions of temperature and pressure adopted to provide a homogeneous copolymer exhibiting but a single phase in the molten state or in the solid state.

4. The polyamide-based composition as defined by claim 1, wherein the dimeric acids contain more than 95% by weight of dimer and less than 0.5% by weight of monomer.

5. The polyamide-based composition as defined by claim 1, said polyamide (3) comprising a polyamide obtained by polycondensation of diacids other than fatty dimers with diamines, by homopolycondensation of aminoacids or by polymerization of lactams.

6. The polyamide-based composition as defined by claim 1, wherein the amount of the at least one elastomer (2) comprises 4% to 60% by weight of the combination of semirigid copolyamide (1)+the at least one elastomer (2).

7. The polyamide-based composition as defined by claim 5, wherein the amount of the at least one elastomer (2) comprises 4% to 60% by weight of the combination of semirigid copolyamide (1)+the at least one elastomer (2)+polyamide (3).

8. A composition according to claim 1 wherein the aliphatic diol containing 2 to 8 carbon atoms within the polyurethane of (2)(e) includes a nitro, chloro, bromo or fluoro substituent.

9. A composition according to claim 1 wherein the copolymer of unsaturated monomers of (2)(g) includes at least one other ethylenically unsaturated comonomer.

10. A masterbatch adapted for preparing the polyamide-based composition as defined by claim 1, comprising 30 to 70% by weight, relative to the weight of the masterbatch, of the at least one (2) and 70 to 30% by weight relative to the weight of the masterbatch of the semirigid copolyamide (1) and polyamide (3).

11. The masterbatch as defined by claim 10, said polyamide (3) comprise a polyaminoacid produced by homopolycondensation of aminoacids or by polymerization of lactams.

12. A molded shaped article comprising the polyamide-based composition as defined by claim 1.

13. A molded shaped article comprising the polyamide-based composition as defined by claim 5.

* * * * *